(12) United States Patent
Hatayama et al.

(10) Patent No.: US 6,333,807 B1
(45) Date of Patent: Dec. 25, 2001

(54) OPTICAL FILTER

(75) Inventors: Hitoshi Hatayama; Eisuke Sasaoka, both of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/626,450

(22) Filed: Jul. 26, 2000

(30) Foreign Application Priority Data

Jul. 27, 1999 (JP) .................................................. 11-212190

(51) Int. Cl.[7] ................................. G02F 1/33; G02B 6/26
(52) U.S. Cl. ............................................... 359/308; 385/39
(58) Field of Search ................................. 385/14, 39, 40, 385/41; 359/308

(56) References Cited

U.S. PATENT DOCUMENTS 4,842,358 * 6/1989 Hall ........................................ 385/12
5,619,368 * 4/1997 Swanson ............................... 359/326

(List continued on next page.)

FOREIGN PATENT DOCUMENTS 06276154    9/1994 (JP) .

OTHER PUBLICATIONS

European Search Report dated Oct. 26, 2000.
"Demonstration of Optical FDM Based Self–Healing Ring Network Employing Arrayed–Waveguide–Grating ADM Filters and EDFAs", Hiromu Toba et al., NTT Transmission Systems Laboratories, pp. 263–266.
"Tunable–Gain Equalization Using a Mach–Zehnder Optical Filter in Multistage Fiber Amplifiers", Kyo Inoue et al., IEEE Photonics Technology Letters, Aug. 3, 1991, pp. 718–720.
"Demostration of Optical FDM Based Self–Healing Ring Network Employing Arrayed–Waveguide–Grating ADM Filters and EDFAs", H. Toba et al., Proceedings of ECOC'94, (1994), pp. 263–266.
Active Gain Slop Compensation in Large–Capacity, Long–Haul WDM Transmission System, T. Naito et al., Proceedings of OAA'98, WC5, (1999), pp. 36–39.

(List continued on next page.)

*Primary Examiner*—Georgia Epps
*Assistant Examiner*—Gary O'Neill
(74) *Attorney, Agent, or Firm*—McDermott, Will & Emery

(57) ABSTRACT

The present invention relates to an optical filter comprising a simple structure which easily realizes slope control of loss spectrum in a signal wavelength band as a gain equalizer. The optical filter comprises a first Mach-Zehnder interferometer constituted by a first part of a main optical line, a first auxiliary optical line, and first and second optical couplers which optically couple the main optical line and first auxiliary optical line to each other. The optical filter further comprises a second Mach-Zehnder interferometer constituted by a second part of the main optical line, a second auxiliary optical line, and third and fourth optical couplers which optically couple the main optical line and second auxiliary optical line to each other. In particular, in order for the slope of loss spectrum in a signal wavelength band to be adjustable while being centered about the amount of loss of light at a reference wavelength propagating through the main optical line from its entrance end to exit end, at least one of the first part of main optical line and the first auxiliary optical line is provided with a first temperature regulating device, at least one of the second part of main optical line and the second auxiliary optical line is provided with a second temperature regulating device, and the first and second temperature regulating devices are controlled by a control system.

8 Claims, 5 Drawing Sheets

U.S. PATENT DOCUMENTS 5,745,283 * 4/1998 Inagaki .............................. 359/337.13
6,144,486 * 11/2000 Bennett ............................ 359/337.13
6,256,428 * 7/2001 Norwood ................................ 385/17

OTHER PUBLICATIONS

"Active Gain–Tilt Equalization by Preferentially 1.43 μm–or 1.48 μm–Pumped Raman Amplification", M. Takeda et al., ThA3, pp. 76–79.

* cited by examiner

OPTICAL FILTER

BACKGROUND OF THE INVENTION

1. Field of the Invention

The present invention relates to an optical filter applicable to gain equalizers for equalizing optical signals in optical amplifiers, and the like.

2. Related Background Art

An optical amplifier includes an amplification optical waveguide doped with a fluorescent material which is excitable with pumping light, and a pumping light source for supplying the pumping light to the optical waveguide; and is disposed in a repeater station in an optical transmission system or the like. In particular, it is important for the optical amplifier employed in a wavelength division multiplexing transmission system (WDM transmission system) transmitting a plurality of wavelengths of optical signals to not only collectively amplify a plurality of wavelengths of optical signals with gains identical to each other, but also output the individual optical signals with their power attaining a predetermined target value. Therefore, in order to equalize the amplification gain of optical signals in such an optical amplifier, an optical filter having a loss spectrum with a form identical to that of the gain spectrum in the signal wavelength band has been in use.

For example, a technique aimed at flattening the gain of an optical amplifier by use of an optical filter employing a Mach-Zehnder interferometer is disclosed in the document 1, K. Inoue, et al., "Tunable Gain Equalization Using a Mach-Zehnder Optical Filter in Multistage Fiber Amplifiers," IEEE Photonics Technology letters, Vol. 3, No. 8, pp. 718–720 (1991). Also, an optical filter in which two optical filters each having the structure described in the above-mentioned document 1 are cascaded to each other is disclosed in the document 2, H. Toba, et al., "Demonstration of Optical FDM Based Self-Healing Ring Network Employing Arrayed-Waveguide-Grating ADM Filters and EDFAs," Proceedings of ECOC'94, pp. 263–266 (1994). Further, an optical filter comprising a Faraday rotator adapted to alter the amount of rotation of polarizing azimuth of light, a birefringent plate, two birefringent wedge-shaped members, and a lens system is disclosed in the document 3, T. Naito, et al., "Active Gain Slope Compensation in Large-Capacity, Long-Haul WDM Transmission System," Proceedings of OAA'98, WC5, pp. 36–39 (1999).

SUMMARY OF THE INVENTION

The inventors have studied the conventional techniques mentioned above and, as a result, have found problems as follows. Namely, if the power of optical signals entering an optical amplifier fluctuates due to the fact that the loss in an optical transmission line positioned in front of the optical amplifier fluctuates for some reason in the technique disclosed in the above-mentioned document 1, then the amplification gain for optical signals in the optical amplifier has to be changed in order for the optical signals emitted from the optical amplifier to keep its power constant. If the gain is changed, then the wavelength dependence of gain, i.e., gain slope (slope of a spectrum representing a relationship between wavelength and gain) fluctuates, so that the gain flatness of the optical amplifier is lost, whereby a plurality of wavelengths of optical signals emitted from the optical amplifier yield deviations among their respective powers.

In the technique disclosed in the above-mentioned document 2, for dealing with problems such as those mentioned above, the respective temperatures of the optical couplers and branched optical lines in each Mach-Zehnder interferometer constituting the optical filter are adjusted according to the power of incident optical signals. As a consequence, the slope of loss spectrum (representing a relationship between wavelength and loss) of the optical filter is adjusted, whereby the fluctuation in gain slope accompanying the power fluctuation of incident optical signals is compensated for. However, the slope of loss spectrum in the optical filter is changed according to the power of incident optical signals, and also the loss level of each optical signal in the signal wavelength band fluctuates, whereby the S/N ratio of amplified light outputted from the optical amplifier fluctuates or deteriorates. Also, the number of heaters provided for adjusting the slope of loss spectrum in the optical filter of the document 2 is 6, which is relatively large, whereby the slope control is complicated.

In the technique disclosed in the above-mentioned document 3, the amount of rotation of polarizing azimuth of light in the Faraday rotator is adjusted such that the power deviation among the individual optical signals becomes smaller, whereby the slope of loss spectrum in the optical filter is adjusted. As a result, the power deviation among individual optical signals is lowered. Unlike the technique disclosed in the above-mentioned document 2, the number of components is large in the optical filter of the document 3, whereby not only its configuration is complicated, but also its optical axis adjustment is quite difficult at the time of assembling.

In order to eliminate problems such as those mentioned above, it is an object of the present invention to provide an optical filter comprising a simple structure which can easily realize the slope control of its loss spectrum as a gain equalizer or the like in an optical amplifier.

For achieving the above-mentioned object, the optical filter according to the present invention comprises a main optical line having an entrance end for inputting light in a signal wavelength band and an exit end for emitting the light; and first and second auxiliary optical lines each arranged a long the main optical line. In this optical filter, a first part of the main optical line and the first auxiliary optical line constitute first and second optical couplers, whereas the first part of the main optical line, the first auxiliary optical line, and the first and second optical couplers constitute a first Mach-Zehnder interferometer. Also, a second part of the main optical line and the second auxiliary optical line constitute third and fourth optical couplers, whereas the second part of the main optical line, the second auxiliary optical line, and the third and fourth optical couplers constitute a second Mach-Zehnder interferometer. Further, the optical filter is provided with a first temperature regulating device for regulating the temperature of at least one of the first part of main optical line, which is positioned between the first and second optical couplers, and the first auxiliary optical line, and a second temperature regulating device for regulating the temperature of at least one of the second part of main optical line, which is positioned between the third and fourth optical couplers, and the second auxiliary optical line.

In particular, the optical filter according to the present invention comprises a control system electrically connected to the first and second temperature regulating devices, wherein the control system adjusts, by way of the first and second temperature regulating devices, the temperature of at least one of the first part of the main optical line and first auxiliary optical line and the temperature of at least one of the second part of the main optical line and second auxiliary optical line, thereby regulating the slope of loss spectrum in the optical filter in a state where the amount of loss of light at a reference wavelength in the signal wavelength band is fixed when the light propagates through the main optical line from the entrance end to exit end. Here, the loss spectrum indicates the loss in each wavelength of light in the above-mentioned signal wavelength band when each wavelength of light propagates through the main optical line from the entrance end to exit end.

In this optical filter, as mentioned above, the control system controls the first and second temperature regulating devices, so as to adjust the transmission characteristics of the first and second Mach-Zehnder interferometers, which are cascaded to each other while sharing the main optical line, whereby the slope of loss spectrum in the optical filter is regulated so as to be centered about the amount of loss at a reference wavelength in the signal wavelength band (amount of loss in light at the reference wavelength when propagating from the entrance end to the exit end). Thus, the optical filter according to the present invention comprises a structure for facilitating the slope control of loss spectrum in the optical filter, and is applicable to a gain equalizer or the like in an optical amplifier, for example.

In the optical filter according to the present invention, the first and second temperature regulating devices include a heater, a Peltier device, and the like. The first temperature regulating device may be configured so as to enable temperature control for only one of the first part of main optical line and the first auxiliary optical line, whereas the second temperature regulating device may be configured so as to enable temperature control for only one of the second part of main optical line and the second auxiliary optical line. In the case where the temperature of the first part of the main optical line is adjusted while the temperature of the second auxiliary optical line is adjusted, in particular, the same temperature adjustment can be carried out for both of them (e.g., temperature is raised or lowered in both of them), whereby the slope control of loss spectrum becomes easier in the optical filter.

Also, in the optical filter according to the present invention, the first temperature regulating device may be configured so as to carry out temperature adjustment for both of the first part of the main optical line and the first auxiliary optical line, whereas the second temperature regulating device may be configured so as to carry out temperature adjustment for both of the second part of the main optical line and the second auxiliary optical line. In this case, two pieces of heaters, Peltier devices, or the like as the first temperature regulating device are disposed on the first part of main optical line and the first auxiliary optical line, respectively, whereas two pieces of heaters, Peltier devices, or the like as the second temperature regulating device are disposed on the second part of main optical line and the second auxiliary optical line, respectively. Here, the slope of loss spectrum in the optical filter can be set to a predetermined value (e.g., value 0) when no temperature adjustment is carried out by any of thus provided four pieces of heaters or the like, whereas the slope of loss spectrum can be set not only positive but also negative upon temperature adjustment by two pieces of heaters or the like selected from the four pieces of heaters or the like alone. As a consequence, power consumption can be suppressed to a low level under the control of the first and second temperature regulating devices in this optical filter.

Preferably, in the optical filter according to the present invention, the above-mentioned signal wavelength band includes a band of 1535 nm to 1565 nm or a band of 1575 nm to 1605 nm. Also, in this optical filter, the absolute value of the slope of loss spectrum is changed by the above-mentioned control system and first and second temperature regulating devices preferably at least within the range of 0 to 10 dB/30 nm, more preferably at least within the range of 0 to 5 dB/30 nm. As a consequence of such a configuration, the optical filter according to the present invention is suitable for a gain equalizer for equalizing the gain characteristic of an optical amplifier disposed in a repeater station or the like in an optical transmission system for transmitting WDM signals in a 1.55-$\mu$m wavelength band or 1.59-$\mu$m wavelength band.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, sincevarious changes and modifications within the spirit and scope of the invention will be apparent to those skilled in the art from this detailed description.

DESCRIPTION OF THE PREFERRED EMBODIMENTS

In the following, embodiments of the optical filter according to the present invention will be explained with reference to FIGS. 1 to 5. In the explanation of drawings, constituents identical to each other will be referred to with numerals identical to each other without repeating their overlapping descriptions.

First Embodiment

Figure 1:
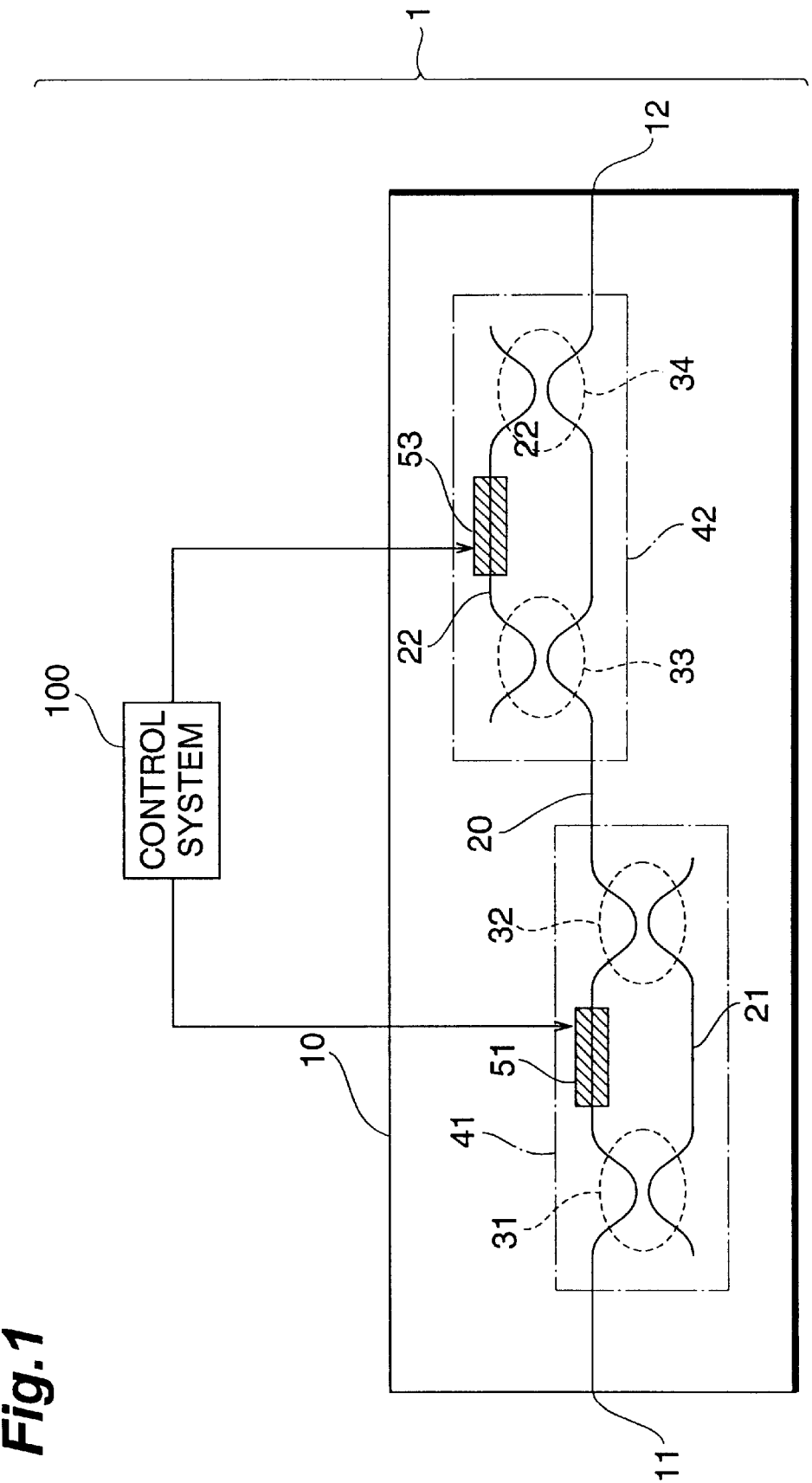
FIG. 1 is a view showing the configuration of a first embodiment of the optical filter according to the present invention.

FIG. 1 is a view showing the configuration of a first embodiment of the optical filter according to the present invention. In FIG. 1, the optical filter 1 according to the first embodiment is a planar optical waveguide circuit disposed on a substrate 10; and comprises a main optical line 20, a first auxiliary optical line 21, a second auxiliary optical line 22, first to fourth optical couplers 31 to 34, heaters 51, 53 as first and second temperature regulating devices, and a control system 100.

On the substrate 10, the first and second optical couplers 31 and 32 are each constructed by optically coupling a part of the main optical line 20 to the first auxiliary optical line 21, whereas the third and fourth optical couplers 33 and 34 are each constructed by optically coupling a part of the main optical line 20 to the second auxiliary optical line 22. The heater 51 is disposed on the part of main optical line 20 positioned between the first and second optical couplers 31, 32, whereas the heater 53 is disposed on the second auxiliary optical line 22 positioned between the third and fourth optical couplers 33, 34. The control system 100 is electrically connected to the heaters 51, 53, and carries out temperature regulation for the main optical line 20 and second auxiliary optical line 22 by way of the heaters 51, 53.

The main optical line 20 is an optical waveguide disposed between an entrance end 11 positioned at one end face of the substrate 10 and an exit end 12 positioned at the other end face thereof. Successively disposed from the entrance end 11 to the exit end 12 are the first optical coupler 31, the second optical coupler 32, the third optical coupler 33, and the fourth optical coupler 34. The main optical line 20 and the first auxiliary optical line 21 are optically coupled to each other by way of the first and second optical couplers 31, 32; whereas a first Mach-Zehnder interferometer 41 is constituted by the main optical line 20, the first auxiliary optical line 21, the first optical coupler 31, and the second optical coupler 32. On the other hand, the other part of the main optical line 20 and the second auxiliary optical line 22 are optically coupled to each other by way of the third and fourth optical couplers 33, 34; whereas a second Mach-Zehnder interferometer 42 is constituted by the main optical line 20, the second auxiliary optical line 22, the third optical coupler 33, and the fourth optical coupler 34. Here, the first and second Mach-Zehnder interferometers 41, 42 are cascaded to each other while sharing the main optical line 20.

In the first embodiment, the heater 51 is disposed on the main optical line 20 positioned between the first and second optical couplers 31, 32. As the control system 100 adjusts the temperature of the main optical line 20 by way of the heater 51, the optical path length difference between the main optical line 20 and the first auxiliary optical line 21 in the first Mach-Zehnder interferometer 41 is adjusted, whereby the transmission characteristic of the first Mach-Zehnder interferometer 41 is adjusted. Also, the heater 53 is disposed on the second auxiliary optical line 22 positioned between the third and fourth optical couplers 33, 34. As the control system 100 regulates the temperature of the second auxiliary optical line 22 by way of the heater 53, the optical path length difference between the main optical line 20 and the second auxiliary optical line 22 in the second Mach-Zehnder interferometer 42 is adjusted, whereby the transmission characteristic of the second Mach-Zehnder interferometer 42 is adjusted.

In the optical filter 1 according to the first embodiment, the loss spectrum $L(\lambda)$ of light propagating through the main optical line 20 from the entrance end 11 toward the exit end 12 follows both of the transmission characteristic $T1(\lambda)$ of the first Mach-Zehnder interferometer 41 based on the optical coupling between the main optical line 20 positioned between the first and second optical couplers 31, 32 and the first auxiliary optical line 21, and the transmission characteristic $T2(\lambda)$ of the second Mach-Zehnder interferometer 42 based on the optical coupling between the main optical line 20 positioned between the third and fourth optical couplers 33, 34 and the second auxiliary optical line 22.

In general, the transmission characteristic $T(\lambda)$ of a Mach-Zehnder interferometer is represented by the following expression (1):

$$T(\lambda)=1-A\cdot\sin^2[2\pi(\lambda-\lambda_0)/\Delta\lambda+\Delta\phi] \qquad (1)$$

Here, $\lambda$ is the wavelength of light. Also, A is the amplitude of transmissivity in the transmission characteristic of the Mach-Zehnder interferometer (given by the relationship between wavelength $\lambda$ and transmissivity, having a plurality of transmission peaks), $\lambda_0$ is the peak wavelength of the transmission peak taken as a design center among the plurality of peaks, and $\Delta\lambda$ is ½ of the period between peak wavelengths in the transmission characteristic, each being a constant determined by structural parameters of the Mach-Zehnder interferometer. On the other hand, $\Delta\phi$ is the phase value which can be set by temperature adjustment. The loss spectrum $L(\lambda)$ of the optical filter 1 is represented by the following expression (2):

$$L(\lambda)=-10\cdot\log[T1(\lambda)\cdot T2(\lambda)] \qquad (2)$$

Also, the slope $S(\lambda)$ of the loss spectrum in the optical filter 1 (indicating the relationship of loss with respect to the wavelength of light propagating through the main optical line 20) is represented by the following expression (3):

$$S(\lambda)=dL(\lambda)/d\lambda \qquad (3)$$

Here, the unit for the loss $L(\lambda)$ at a wavelength of $\lambda$ is dB.

In the optical filter 1, the respective values of constants A, $\lambda_0$, and $\Delta\lambda$ in the first and second Mach-Zehnder interferometers 41, 42 are appropriately designed, so as to enable the control system 100 to carry out temperature control. Namely, as the control system 100 carries out temperature regulation by way of the heaters 51, 53, the value of phase value $\Delta\phi$ is set without the loss $L(\lambda_1)$ at a predetermined wavelength $\lambda_1$ in the signal wavelength band substantially fluctuating. As a consequence, the loss spectrum $L(\lambda)$ in the signal wavelength band and the slope $S(\lambda)$ of the loss spectrum are set.

The inventors have produced first to third samples as the optical filter 1 according to the first embodiment, and have verified that the slope $S(\lambda)$ of loss spectrum does not depend much on wavelength $\lambda$, i.e., the loss spectrum $L(\lambda)$ is excellent in its linearity with respect to wavelength $\lambda$ as follows.

To begin with, the first sample of the optical filter 1 according to the first embodiment is an optical filter which can change the slope of loss spectrum within a range where the maximum of its absolute value is 5 dB/30 nm while the range is centered about a wavelength of 1550 nm (reference wavelength) in a 1.55-/$\mu$m wavelength band (1535 nm to 1565 nm) employed as a signal wavelength band. In the first Mach-Zehnder interferometer 41 of the first sample, the value of structural parameter A is 0.6, the value of $\lambda_0$ is 1550 nm, and the value of $\Delta\lambda$ is 200 nm. In the second Mach-Zehnder interferometer 42, on the other hand, the value of structural parameter A is 0.5, the value of $\lambda_0$ is 1600 nm, and the value of $\Delta\lambda$ is 200 nm.

For the optical filter of the first sample, in the state where the respective values of phase value $\Delta\phi$ in the Mach-Zehnder interferometers 41, 42 were set so as to have the same absolute value with polarities opposite to each other, the inventors measured the loss spectrum with respect to wavelength while changing the phase value $\Delta\phi$ within the range of 0 rad to 0.595 rad. Here, in order to regulate the phase value $\Delta\phi$, the respective temperatures of the main optical line 20 in the first Mach-Zehnder interferometer 41 and the second auxiliary optical line 22 in the second Mach-Zehnder interferometer 42 were controlled by the control system 100 by way of the heaters 51, 53.

Figure 2:
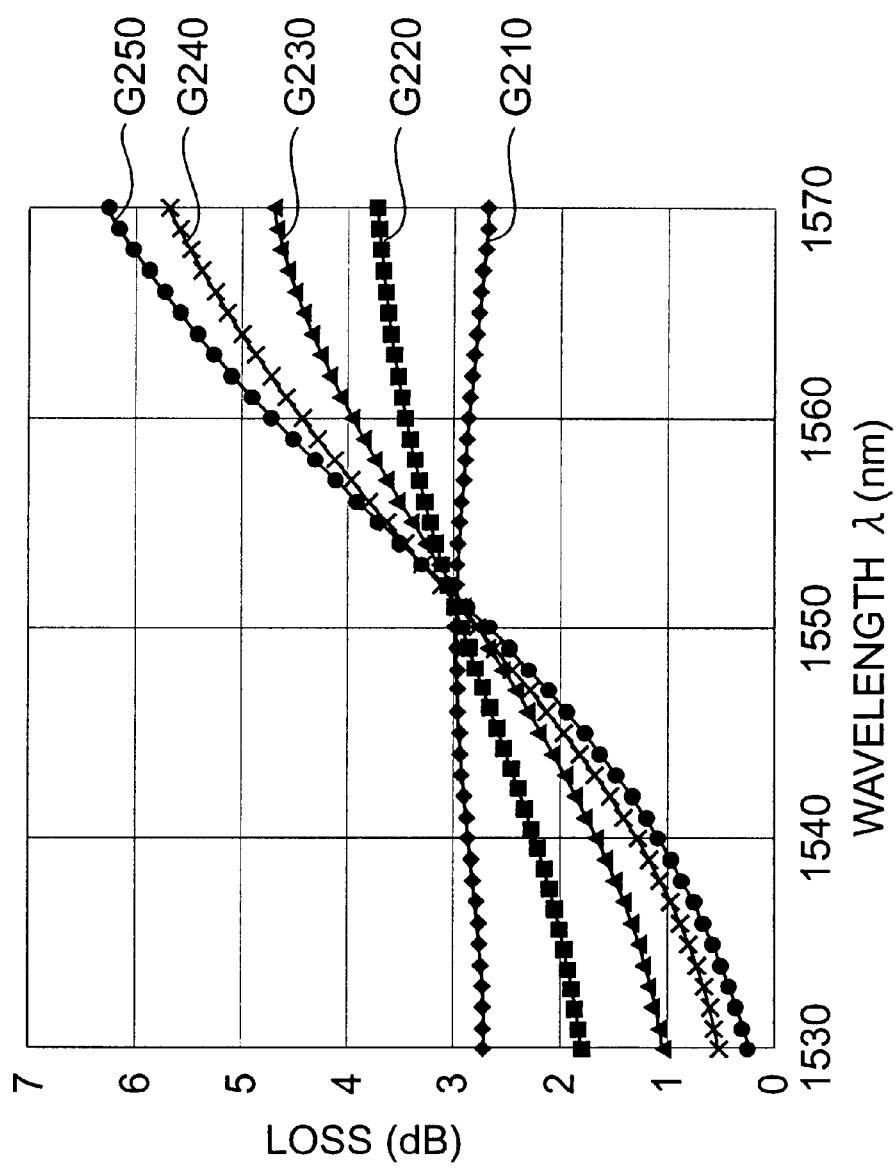
FIG. 2 is a spectrum chart in which loss spectra of a first sample prepared as the optical filter according to the first embodiment are shown for respective values of phase value $\Delta\phi$.

FIG. 2 shows respective loss spectra with respect to wavelength for individual values of phase value $\Delta\phi$ in the optical filter of the first sample. In FIG. 2, G210, G220, G230, G240, and G250 indicate loss spectra when the phase value Δφ is set to 0 rad, 0.157 rad, 0.313 rad, 0.470 rad, and 0.595 rad, respectively. Near the center wavelength 1550 nm in the wavelength band of 1535 nm to 1565 nm, loss is 2.73 dB to 3.01 dB and thus is substantially constant in each of these spectra G210 to G250. Also, it is seen that the slope of loss spectra G210 to G250 can be set within the range of 0 to 5.05 dB/30 nm in the above-mentioned wavelength band. Also, the maximum value of deviation of these loss spectra G210 to G250 from their respective approximating lines passing a point yielding a loss of 2.89 dB (loss at the center wavelength of 1550 nm) is ±0.21 dB when the phase value Δφ is 0.595 rad, thus being sufficiently small, and also the slope of each loss spectrum is excellent in its linearity.

In the first sample, if the respective structural parameters of the first and second Mach-Zehnder interferometers 41, 42 are appropriately set such that the phase value Δφ becomes 0 when the temperature of the main optical line 20 and second auxiliary optical line 22 is adjusted to a predetermined bias temperature by means of the heaters 51, 53, then the value of phase value Δφ can be changed within the range of 0 rad to +0.595 rad when the temperature of the main optical line 20 and second auxiliary optical line 22 is raised from the above-mentioned bias temperature, whereas the value of phase value Δφ can be changed within the range of −0.595 rad to 0 rad when the temperature of the main optical line 20 and second auxiliary optical line 22 is lowered from the above-mentioned bias temperature (loss spectrum slope control effected by the control system 100). When the value of phase value Δφ is thus changed within the range of −0.595 rad to +0.595 rad, the slope of loss spectrum in the optical filter of the first sample can be set within the range of −5 dB/30 nm to +5 dB/30 nm in the wavelength band of 1535 nm to 1565 nm.

In the optical filter of the first sample, the first and second temperature regulating devices may be Peltier devices instead of the heaters 51, 53. Even when Peltier devices are employed as the first and second temperature regulating devices, the value of phase value Δφ can be set not only positive but also negative by raising or lowering the temperature of the main optical line 20 and second auxiliary optical line 22. As in the foregoing, when the value of phase value Δφ is changed within the range of −0.595 rad to +0.595 rad, the slope of loss spectrum can be set within the range of −5 dB/30 nm to +5 dB/30 nm while being centered about a predetermined wavelength in the wavelength band of 1535 nm to 1565 nm.

The second sample of the optical filter according to the first embodiment is an optical filter which can change the slope of loss spectrum within a range where the maximum of its absolute value is 10 dB/30 nm while the range is centered about a wavelength of 1550 nm (reference wavelength) in a 1.55-μm wavelength band (1535 nm to 1565 nm) employed as a signal wavelength band. In the first Mach-Zehnder interferometer 41 of the second sample, the value of structural parameter A is 0.85, the value of $\lambda_0$ is 1550 nm, and the value of Δλ is 200 nm. In the second Mach-Zehnder interferometer 42, on the other hand, the value of structural parameter A is 0.60, the value of $\lambda_0$ is 1600 nm, and the value of Δλ is 200 nm.

For the optical filter of the second sample, as with the first sample, in the state where the respective values of phase value Δφ in the Mach-Zehnder interferometers 41, 42 were set so as to have the same absolute value with polarities opposite to each other, the inventors measured the loss spectrum with respect to wavelength while changing the phase value Δφ within the range of 0 rad to 0.595 rad. Here, in order to regulate the phase value Δφ, the respective temperatures of the main optical line 20 in the first Mach-Zehnder interferometer 41 and the second auxiliary optical line 22 in the second Mach-Zehnder interferometer 42 were controlled by the control system 100 by way of the heaters 51, 53.

Figure 3:
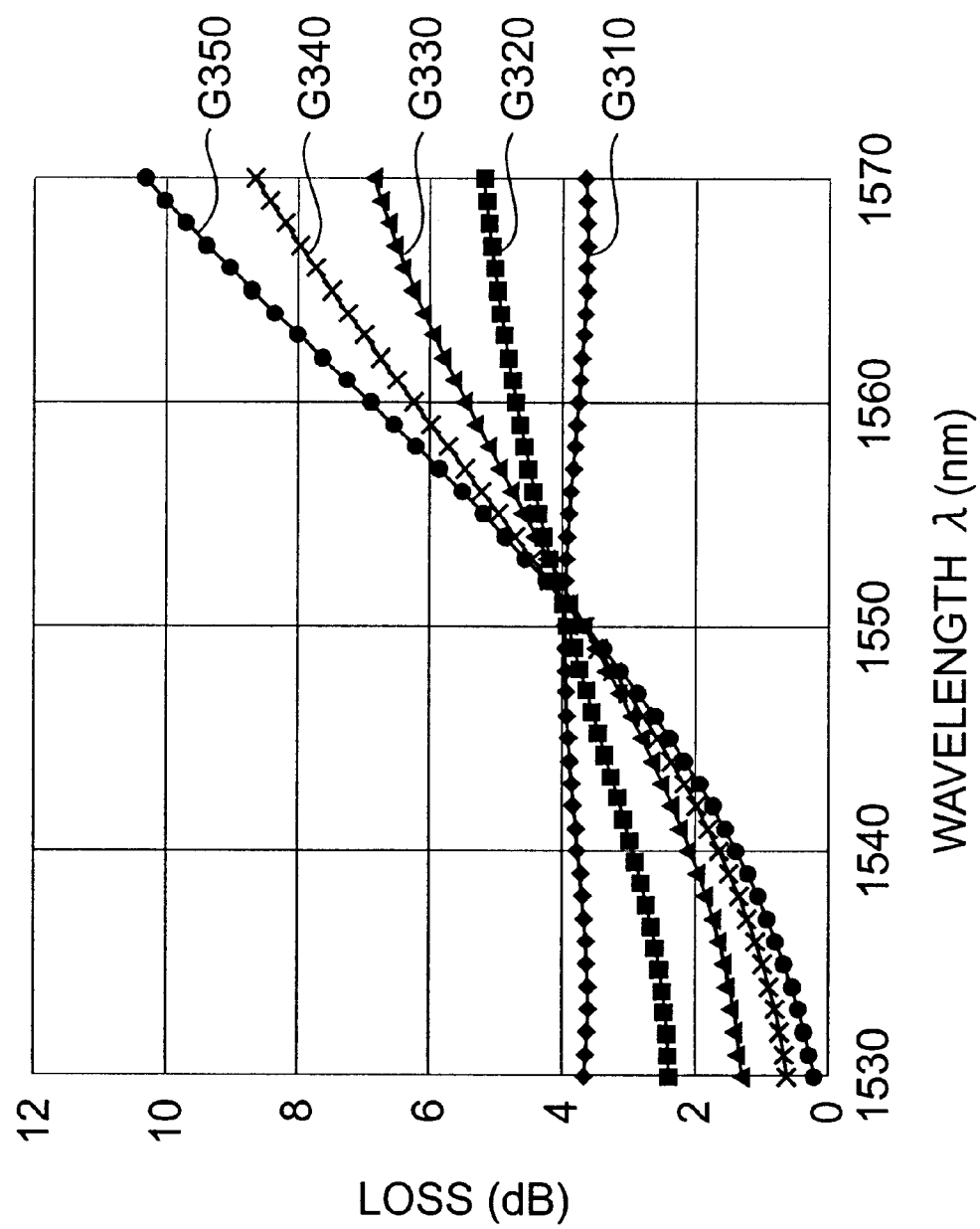
FIG. 3 is a spectrum chart in which loss spectra of a second sample prepared as the optical filter according to the first embodiment are shown for respective values of phase value $\Delta\phi$.

FIG. 3 shows respective loss spectra with respect to wavelength for individual values of phase value Δφ in the optical filter of the second sample. In FIG. 3, G310, G320, G330, G340, and G350 indicate loss spectra when the phase value Δφ is set to 0 rad, 0.157 rad, 0.313 rad, 0.470 rad, and 0.595 rad, respectively. Near the center wavelength 1550 nm in the wavelength band of 1535 nm to 1565 nm, loss is 3.65 dB to 3.98 dB and thus is substantially constant in each of these spectra G310 to G350. Also, it is seen that the slope of loss spectra G310 to G350 can be set with in the range of 0 to 10 dB/30 nm in the above-mentioned wavelength band. Also, the maximum value of deviation of these loss spectra G310 to G350 from their respective approximating lines passing a point yielding a loss of 0.87 dB (loss at the center wavelength of 1550 nm) is ±0. 87 dB when the phase value Δφ is 0.314 rad, thus being sufficiently small, and also the slope of each loss spectrum is excellent in its linearity.

In the second sample, if the respective structural parameters of the first and second Mach-Zehnder interferometers 41, 42 are appropriately set such that the phase value Δφ becomes 0 when the temperature of the main optical line 20 and second auxiliary optical line 22 is adjusted to a predetermined bias temperature by means of the heaters 51, 53, then the value of phase value Δφ can be set not only positive but also negative when the temperature of the main optical line 20 and second auxiliary optical line 22 is raised or lowered from the above-mentioned bias temperature. The first and second temperature regulating devices may be Peltier devices instead of the heaters 51, 53. The temperature of the main optical line 20 and second auxiliary optical line 22 may be raised or lowered by means of the Peltier devices, so as to set the phase value Δφ not only positive but also negative. When the value of phase value Δφ is thus changed within the range of −0.595 rad to +0.595 rad, the slope of loss spectrum in the optical filter of the second sample can be set within the range of −10 dB/30 nm to +10 dB/30 nm in the wavelength band of 1535 nm to 1565 nm.

Figure 4:
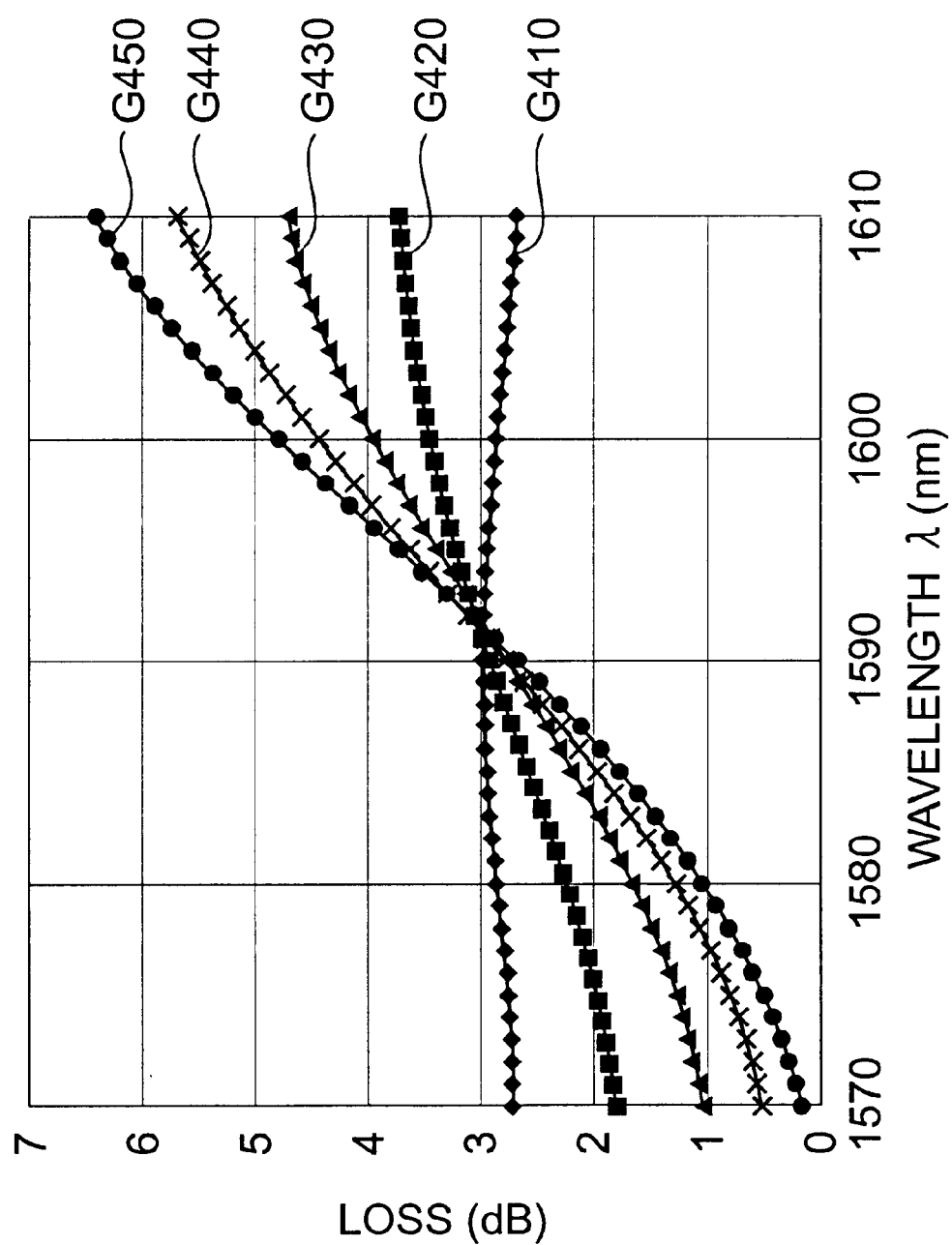
FIG. 4 is a spectrum chart in which loss spectra of a third sample of the optical filter according to the first embodiment are shown for respective values of phase value $\Delta\phi$.

FIG. 4 shows the respective loss spectra with respect to wavelength for individual values of phase value Δφ in the optical filter of the third sample. The optical filter of the third sample is an optical filter which can change the slope of loss spectrum within a range where the maximum of its absolute value is 5 dB/30 nm while the range is centered about a wavelength of 1590 nm (reference wavelength) in a 1.59-μm wavelength band (1575 nm to 1605 nm) employed as a signal wavelength band. In the first Mach-Zehnder interferometer 41 of the third sample, the value of structural parameter A is 0.6, the value of $\lambda_0$ is 1590 nm, and the value of Δφ is 200 nm. In the second Mach-Zehnder interferometer 41, on the other hand, the value of structural parameter A is 0.5, the value of $\lambda_0$ is 1640 nm, and the value of Δλ is 200 nm.

For the optical filter of the third sample, in the state where the respective values of phase value Δφ in the Mach-Zehnder interferometers 41, 42 were set so as to have the same absolute value with polarities opposite to each other, the inventors measured the loss spectrum with respect to wavelength while changing the phase value Δφ within the range of 0 rad to 0.595 rad.

Here, in order to regulate the phase value Δφ, the respective temperatures of the main optical line 20 in the first Mach-Zehnder interferometer 41 and the second auxiliary optical line 22 in the second Mach-Zehnder interferometer 42 were controlled by the control system 100 by way of the heaters 51, 53 in the third sample as in the first and second samples. In FIG. 4, G410, G420, G430, G440, and G450 indicate loss spectra when the phase value $\Delta\phi$ is set to 0 rad, 0.157 rad, 0.313 rad, 0.470 rad, and 0.595 rad, respectively.

Near the center wavelength 1590 nm in the wavelength band of 1575 nm to 1605 nm, loss is 2.73 dB to 3.01 dB and thus is substantially constant in each of these spectra G410 to G450. Also, it is seen that the slope of loss spectra G410 to G450 can be set within the range of 0 to 5 dB/30 nm in the above-mentioned wavelength band. Also, the maximum value of deviation of these loss spectra G410 to G450 from their respective approximating lines passing a point yielding a loss of 2.89 dB (loss at the center wavelength of 1590 nm) is ±0.21 dB when the phase value $\Delta\phi$ is 0.595 rad, thus being sufficiently small, and also the slope of each loss spectrum is excellent in its linearity.

The first and second temperature regulating devices may be Peltier devices instead of the heaters 51, 53 in the optical filter of the third sample as well. If the respective structural parameters of the first and second Mach-Zehnder interferometers 41, 42 are appropriately set such that the phase value $\Delta\phi$ becomes 0 when the temperature of the main optical line 20 and second auxiliary optical line 22 is adjusted to a predetermined bias temperature by means of the heaters 51, 53, then the value of phase value $\Delta\phi$ can be set not only positive but also negative by raising or lowering the temperature of the main optical line 20 and second auxiliary optical line 22 from the above-mentioned bias temperature. When the value of phase value $\Delta\phi$ is thus changed within the range of −0.595 rad to +0.595 rad, the slope of loss spectrum in the optical filter of the second sample can be set within the range of −5 dB/30 nm to +5 dB/30 nm in the wavelength band of 1575 nm to 1605 nm.

In the first to third samples of the optical filter 1 according to the first embodiment, as in the foregoing, the control system 100 carries out temperature adjustment without substantially causing the loss value at a predetermined wavelength (reference wavelength) in the signal wavelength band to fluctuate, whereby the phase value $\Delta\phi$ is set. As a consequence, the slope of loss spectrum with respect to wavelength in the signal wavelength band is set within a desirable range. Thus, the optical filter 1 according to the first embodiment has a simple structure which easily realizes the slope control for loss spectrum. Also, the optical filter 1 is excellent in the linearity of its slope of loss spectrum. Further, since individual constituents are formed as being integrated on the substrate 10, the optical filter 1 has a small size and a small number of components. Also, its optical adjustment is quite easy since optical axis adjustment is needed only at each of the entrance end 11 and exit end 12 of optical signals.

Also, the first embodiment may be configured such that, without providing the heater 51, a Peltier device is disposed on the first auxiliary optical line 21 positioned between the first and second optical couplers 31, 32, so as to lower the temperature of the first auxiliary optical line 21 by means of the Peltier device. Alternatively, the first embodiment may be configured such that, without providing the heater 53, a Peltier device is disposed on the main optical line 20 positioned between the third and fourth optical couplers 33, 34, so as to lower the temperature of the main optical line 20 by means of the Peltier device. In either configuration, effects similar to those mentioned above are obtained.

As a consequence, the optical filter 1 according to the first embodiment is suitable for a gain equalizer in an optical amplifier, for example. If the loss in an optical transmission line positioned in front of a conventional optical amplifier fluctuates for some reason, thereby causing the power of optical signals entering the optical amplifier to fluctuate, then the optical amplifier changes its amplification gain in order to keep the power of optical signals emitted from the optical amplifier constant. If gain is changed as such, then the wavelength dependence of gain, i.e., gain slope, fluctuates, whereby the flatness of gain in the optical amplifier itself is lost. If the optical filter 1 according to the first embodiment is employed as a gain equalizer in the optical amplifier, however, then the phase value $\Delta\phi$ of the optical filter 1, i.e., the slope of loss spectrum, is appropriately adjusted by the control system, whereby the fluctuation in gain slope caused by the power fluctuation in incident optical signals can be sufficiently compensated for by the slope control for loss spectrum in the optical filter 1. Here, even when the slope of loss spectrum in the optical filter 1 is changed, the loss at a predetermined center wavelength (reference wavelength) in the signal wavelength band would not fluctuate, whereby the S/N ratio of amplified optical signals outputted from the optical amplifier would not deteriorate. In the case where the signal wavelength band and center wavelength (reference wavelength) are set, as in the above-mentioned first to third samples, in particular, the optical filter 1 according to the first embodiment is suitable for a gain equalizer which equalizes the gain characteristic of an optical amplifier disposed in a repeater station or the like in an optical transmission system for transmitting a plurality of wavelengths of optical signals (WDM signals) in the 1.55-$\mu$m wavelength band or 1.59-$\mu$m wavelength band.

Second Embodiment

Figure 5:
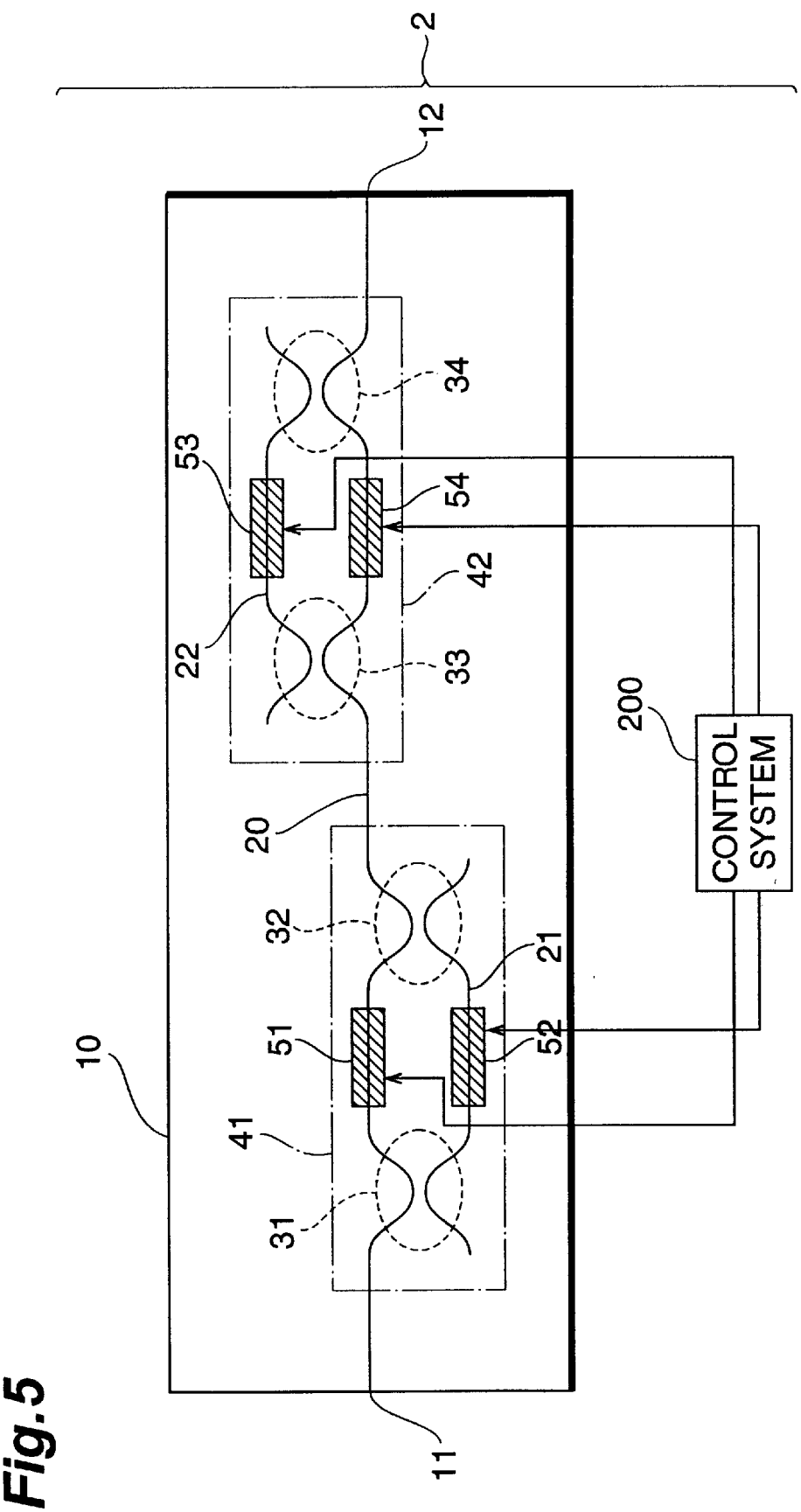
FIG. 5 is a view showing the configuration of a second embodiment of the optical filter according to the present invention.

A second embodiment of the optical filter according to the present invention will now be explained. FIG. 5 is a view showing the configuration of the optical filter according to the second embodiment. The optical filter 2 according to the second embodiment differs from the optical filter 1 according to the first embodiment in that it further comprises a heater 52 as first temperature adjusting means in addition to the heater 51 and in that it further comprises a heater 54 as second temperature adjusting means in addition to the heater 53.

The heater 52 is disposed on the first auxiliary optical line 21 positioned between the first and second optical couplers 31, 32, whereas a control system 200 adjusts the temperature of the first auxiliary optical line 21 by way of the heater 52. The heater 52 is provided for adjusting, together with the heater 51, the optical path length difference between the main optical line 20 and first auxiliary optical line 21 in the first Mach-Zehnder interferometer 41, so as to regulate the transmission characteristic T1($\lambda$) of the first Mach-Zehnder interferometer 41. On the other hand, the heater 54 is disposed on the main optical line 20 positioned between the third and fourth optical couplers 33, 34, whereas the control system 200 adjusts the temperature of the main optical line 20 by way of the heater 54. The heater 54 is provided for adjusting, together with the heater 53, the optical path length difference between the main optical line 20 and second auxiliary optical line 22 in the second Mach-Zehnder interferometer 42, so as to regulate the transmission characteristic T2($\lambda$) of the second Mach-Zehnder interferometer 42.

The respective transmission characteristics of the first and second Mach-Zehnder interferometers 41, 42 are represented by the above-mentioned expression (1), and the total loss spectrum L($\lambda$) of the optical filter 2 is represented by the above-mentioned expression (2) in the second embodiment as well. If the respective values of constant A, $\lambda_0$, and $\Delta\phi$ in the first and second Mach-Zehnder interferometers 41, 42 are appropriately designed, then the loss spectrum L($\lambda$) of the optical filter 2 is such that the loss at a predetermined wavelength (reference wavelength) in a signal wavelength band is substantially constant, whereas the value of phase value $\Delta\phi$ is set by the temperature adjustment effected by the control system 200 by way of the heaters 51 to 54. As a consequence, the slope of loss spectrum of the optical filter in the above-mentioned signal wavelength band is regulated.

In the second embodiment, the phase value $\Delta\phi$ of the first Mach-Zehnder interferometer 41 is adjusted by the difference between the respective temperatures of the main optical line 20 and first auxiliary optical line 21 set by means of the heaters 51, 52. For example, the phase value $\Delta\phi$ of the first Mach-Zehnder interferometer 41 increases if the temperature of the main optical line 20 is raised by means of the heater 51, whereas the phase value $\Delta\phi$ of the first Mach-Zehnder interferometer 41 decreases if the temperature of the first auxiliary optical line 21 is raised by means of the heater 52.

Similarly, the phase value $\Delta\phi$ of the second Mach-Zehnder interferometer 42 is adjusted by the difference between the respective temperatures of the main optical line 20 and second auxiliary optical line 22 set by means of the heaters 53, 54. For example, the phase value $\Delta\phi$ of the second Mach-Zehnder interferometer 42 increases if the temperature of the second auxiliary optical line 22 is raised by means of the heater 53, whereas the phase value $\Delta\phi$ of the second Mach-Zehnder interferometer 42 decreases if the temperature of the main optical line 20 is raised by means of the heater 54.

Namely, the optical filter 2 according to the second embodiment is designed such that, when none of the heaters 51 to 54 carries out temperature adjustment, the phase value $\Delta\phi$ becomes a predetermined value $\Delta\phi_0$ (e.g., $\Delta\phi_0=0$), whereby the slope S of loss spectrum in the optical filter becomes a predetermined value So (e.g., $S_0=0$). Here, without temperature adjustment being carried out by the heaters 52, 54, the phase value $\Delta\phi$ can be changed within the range of $\Delta\phi>\Delta\phi_0$ if the control system 200 carries out temperature adjustment of the main optical line 20 in the first Mach-Zehnder interferometer 41 and the second auxiliary optical line 22 in the second Mach-Zehnder interferometer 42 by way of the heaters 51, 53, whereby the slope S of loss spectrum in the optical filter 2 can be changed within the range of $S>S_0$. Conversely, without temperature adjustment being carried out by the heaters 51, 53, the phase value $\Delta\phi$ can be changed within the range of $\Delta\phi<\Delta\phi_0$ if the control system 200 carries out temperature adjustment of the first auxiliary optical line 21 in the first Mach-Zehnder interferometer 41 and the main optical line 20 in the second Mach-Zehnder interferometer 42 by way of the heaters 52, 54, whereby the slope S of loss spectrum in the optical filter 2 can be changed within the range of $S<S_0$.

In the optical filter 2 according to the second embodiment, as in the foregoing, the phase value $\Delta\phi$, i.e., the slope of loss spectrum, can be set to 0 when no temperature adjustment is carried out by means of any of the four heaters 51 to 54, whereas the phase value $\Delta\phi$, i.e., the slope of loss spectrum, can be set not only positive but also negative by temperature adjustment carried out by two heaters selected from the four heaters 51 to 54 alone. Therefore, the optical filter 2 according to the second embodiment not only exhibits effects similar to those exhibited by the optical filter 1 according to the first embodiment, but also makes it possible to suppress its power consumption more as compared with the case where the phase value $\Delta\phi$ is set to 0 at a predetermined bias temperature in the optical filter 1 according to the first embodiment.

As the first and second temperature regulating devices, Peltier devices can be employed in place of the heaters 51 to 54 in the second embodiment as well. In this case, the phase value $\Delta\phi$, i.e., the slope of loss spectrum, can be set not only positive but also negative by raising one of the temperature of the main optical line 20 in the first Mach-Zehnder interferometer 41 or the second auxiliary optical line 22 in the second Mach-Zehnder interferometer 42 and the temperature of the first auxiliary optical line 21 in the first Mach-Zehnder interferometer 41 or the main optical line 20 in the second Mach-Zehnder interferometer 42, and lowering the other, for example. This case is also preferable in that it can suppress the power consumption to a low level.

The present invention is not restricted to the optical filters explained as embodiments, but various modifications are possible therein. For example, in the optical filter according to the present invention, it is not always necessary for individual constituents to be integrated on a single substrate, but each of the first optical line, first auxiliary optical line, and second auxiliary optical line may be realized by an optical fiber, whereas each of the first to fourth optical couplers may be realized by an optical fiber coupler. This case is preferable in that insertion loss decreases when the optical filter is disposed on the optical fiber transmission line.

In accordance with the present invention, as in the foregoing, the respective transmission characteristics of the first and second Mach-Zehnder interferometers cascaded to each other while sharing a main optical line are regulated by temperature adjustment effected by a control system by way of first and second temperature regulating devices, whereby the slope of loss spectrum in light with respect to wavelength in a signal wavelength band is adjusted without substantially causing the loss at a reference wavelength in the signal wavelength band to fluctuate. Thus, this optical filter comprises a simple structure which easily realizes the slope control of loss spectrum in the signal wavelength band. As a consequence, this optical filter is suitable for a gain equalizer or the like in an optical amplifier, for example. Even if a slope occurs in a gain spectrum due to the fact that the amplification gain of an optical amplifier fluctuates along with the power fluctuation of inputted signals, the optical filter can compensate for this gain slope. Also, even when the slope of loss spectrum in the optical filter is changed, the loss at a reference wavelength in the signal wavelength band is substantially unchanged, whereby the S/N ratio of signals outputted from the optical amplifier would not deteriorate.

In the case where the temperature of one of the part of main optical line positioned between the first and second optical couplers and the first auxiliary optical line is adjusted by means of the first temperature regulating device, whereas the temperature of one of the part of main optical line positioned between the third and fourth optical couplers and the second auxiliary optical line is adjusted by means of the second temperature regulating device, it is only necessary that one piece of heater, Peltier device, or the like be provided as the first temperature regulating device, and that one piece of heater, Peltier device, or the like be provided as the second temperature regulating device, whereby a simple configuration can be realized. In particular, in the case where the temperature of the main optical line positioned between the first and second optical couplers is adjusted while the temperature of the second auxiliary optical line positioned between the third and fourth optical couplers is adjusted, both of them can be subjected to the same temperature adjustment (e.g., temperature is raised or lowered in both of them), whereby a simpler configuration can be realized.

In the case where both of the temperature of the part of main optical line positioned between the first and second optical couplers and the temperature of the first auxiliary optical line are adjusted by means of the first temperature regulating device, whereas both of the temperature of the part of main optical line positioned between the third and fourth optical couplers and the temperature of the second auxiliary optical line are adjusted by means of the second temperature regulating device, two pieces of heaters, Peltier devices, or the like are provided as the first temperature regulating device, whereas two pieces of heaters, Peltier devices, or the like are provided as the second temperature regulating device. Here, when no temperature adjustment is carried out by means of any of the four heaters, the slope of loss spectrum can be set to a predetermined value. Also, the slope of loss spectrum can be set not only positive but also negative by temperature adjustment carried out by two heaters or the like selected from the four heaters or the like alone. As a consequence, it is preferable in that power consumption is low.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical filter comprising:
   a main optical line having an entrance end for inputting light in a signal wavelength band and an exit end for emitting said light;
   a first auxiliary optical line arranged so as to constitute a first optical coupler and a second optical coupler together with said main optical line, said first auxiliary optical line constituting a first Mach-Zehnder interferometer together with said main optical line, said first optical coupler and said second optical coupler;
   a second auxiliary optical line arranged so as to constitute a third optical coupler and a fourth optical coupler together with said main optical line, said second auxiliary optical line constituting a second Mach-Zehnder interferometer together with said main optical line, said third optical coupler and said fourth optical coupler;
   a first temperature regulating device for adjusting a temperature of at least one of a first part of said main optical line, which is positioned between said first and second optical couplers, and said first auxiliary optical line;
   a second temperature regulating device for adjusting a temperature of at least one of a second part of said main optical line, which is positioned between said third and fourth optical couplers, and said second auxiliary optical line; and
   a control system, electrically connected to said first and second temperature regulating devices, for carrying out temperature control with respect to at least one of the first part of main optical line and said first auxiliary optical line by way of said first temperature regulating device, and also carrying out temperature control with respect to at least one of the second part of main optical line and said second auxiliary optical line by way of said second temperature regulating device, said control system controlling said first and second temperature regulating devices so as to regulate a slope of loss spectrum in said signal wavelength band without substantially changing an amount of loss of light at a reference wavelength in said signal wavelength band when said light propagates through said main optical line from said entrance end to said exit end.

2. An optical filter according to claim 1, wherein at least one of said first and second temperature regulating devices is provided on said main optical line.

3. An optical filter according to claim 1, wherein said signal wavelength band includes a band of 1535 nm to 1565 nm.

4. An optical filter according to claim 3, wherein said control system controls said first and second temperature regulating devices so as to change the absolute value of said slope of loss spectrum at least within the range of 0 to 10 dB/30 nm.

5. An optical filter according to claim 4, wherein said control system controls said first and second temperature regulating devices so as to change the absolute value of said slope of loss spectrum at least within the range of 0 to 5 dB/30 nm.

6. An optical filter according to claim 1, wherein said signal wavelength band includes a band of 1575 nm to 1605 nm.

7. An optical filter according to claim 6, wherein said control system controls said first and second temperature regulating devices so as to change the absolute value of said slope of loss spectrum at least within the range of 0 to 10 dB/30 nm.

8. An optical filter according to claim 7, wherein said control system controls said first and second temperature regulating devices so as to change the absolute value of said slope of loss spectrum at least within the range of 0 to 5 dB/30 nm.

* * * * *